(12) United States Patent
Panther et al.

(10) Patent No.: US 9,665,076 B2
(45) Date of Patent: May 30, 2017

(54) METHODS AND APPARATUS TO INTERFACE WITH A DIGITAL CONTROL LOOP

(71) Applicant: Fisher Controls International LLC, Marshalltown, IA (US)

(72) Inventors: Mitchell Stephen Panther, Marshalltown, IA (US); Brian J. Burlage, Marshalltown, IA (US); Rickey Lee Osborn, Ames, IA (US); Carter Bill Cartwright, Ames, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 488 days.

(21) Appl. No.: 13/750,754

(22) Filed: Jan. 25, 2013

(65) Prior Publication Data
US 2014/0214186 A1 Jul. 31, 2014

(51) Int. Cl.
*G05B 15/02* (2006.01)
*G05B 19/042* (2006.01)

(52) U.S. Cl.
CPC ............ *G05B 15/02* (2013.01); *G05B 19/042* (2013.01); *G05B 2219/24084* (2013.01); *G05B 2219/25428* (2013.01)

(58) Field of Classification Search
CPC .................. G05B 15/02; G05B 19/042; G05B 2214/25428; G05B 2214/24084; G05B 19/0426; G05B 19/409

USPC .............................................. 700/17, 31, 83
See application file for complete search history.

(56) References Cited

U.S. PATENT DOCUMENTS

| 4,149,237 | A | 4/1979 | Freitas |
|---|---|---|---|
| 2005/0040250 | A1* | 2/2005 | Wruck ............................ 236/51 |
| 2005/0247056 | A1* | 11/2005 | Cogswell et al. .............. 60/531 |
| 2006/0291438 | A1 | 12/2006 | Karschnia et al. |
| 2011/0125328 | A1* | 5/2011 | Lingrey ................. G05B 15/02 700/276 |
| 2012/0215326 | A1* | 8/2012 | Brown et al. .................... 700/42 |

FOREIGN PATENT DOCUMENTS

GB 918747 2/1963

OTHER PUBLICATIONS

International Searching Authority, "Search Report", issued in connection with PCT patent application No. PCT/US2014/012945, mailed on May 22, 2014, 3 pages.

(Continued)

*Primary Examiner* — Christopher E Everett
(74) *Attorney, Agent, or Firm* — Hanley, Flight & Zimmerman, LLC

(57) ABSTRACT

Example methods and apparatus to interface with a control a loop are disclosed. An example apparatus includes a loop controller to control a control loop, a sensor to provide a measurement value to the loop controller, a device controller to adjust a control device based on an output from the loop controller, and a loop interface to receive a set point value and send the set point value to the loop controller, wherein the loop interface is different from a host device communicatively coupled to the loop controller.

22 Claims, 5 Drawing Sheets

(56) References Cited

OTHER PUBLICATIONS

International Searching Authority, "Written Opinion", issued in connection with PCT patent application No. PCT/US2014/012945, mailed on May 22, 2014, 7 pages.

International Searching Authority, "International Preliminary Report on Patentability", issued in connection with PCT patent application No. PCT/US2014/012945, mailed on Jul. 28, 2015, 9 pages.

* cited by examiner

METHODS AND APPARATUS TO INTERFACE WITH A DIGITAL CONTROL LOOP

FIELD OF THE DISCLOSURE

This disclosure relates generally to control loops, and, more particularly, to methods and apparatus to interface with a digital control loop.

BACKGROUND

Control systems are commonly used to regulate outputs of field devices (e.g., heaters, valve controllers, sensors, flow controllers, etc.). Such control systems typically include a loop controller (e.g., a proportional-integral-controller (PID)). A loop controller adjusts an output based on a desired setting (e.g., a set point) and a current level and/or value of a measured output such that the measured value approaches or reaches the desired setting. A host device (e.g., a computer or central control device), often times located at a central facility, is used to adjust the desired setting for the loop controller, which is commonly located at a field location relatively remote to the central facility. The host device may be disconnected from the loop controller after setup, at which point the loop controller continues to run using the desired setting in effect when the host was disconnected.

SUMMARY

An example apparatus includes a loop controller to control a control loop, a sensor to provide a measurement value to the loop controller, a device controller to adjust a control device based on an output from the loop controller, and a loop interface to receive a set point value and send the set point value to the loop controller, wherein the loop interface is different from a host device communicatively coupled to the loop controller.

An example method includes sending a measurement to a loop controller in a control loop, adjusting a control device based on an output from the loop controller, receiving a set point from a user at a loop interface connected to the control loop, and sending the set point from the loop interface to the loop controller, wherein the loop interface is different from a host device in communication with the loop controller.

An example tangible computer readable storage medium include instructions that, when executed, cause a machine to send a set point received from a user via a loop interface to a loop controller of a control loop to adjust a control device based on the set point and a measurement value from a sensor, wherein the loop interface is different from a host device capable of communicating with the loop controller.

An example apparatus includes an input port to receive a set point value from a user, an analog input block that sends the set point value to a loop controller of a control loop, and a display for displaying the set point, wherein the apparatus is to be located proximate to the control loop.

An example method includes receiving a set point value for a control loop via a loop interface, determining whether a host is communicatively coupled to the control loop, overriding a host connection between the host and the control loop when the host is connected to the control loop, and adjusting the set point of the control loop to the set point value.

DETAILED DESCRIPTION

Example methods and apparatus disclosed herein are used as an interface for a digital control loop of a process control system. In the examples disclosed herein, a loop interface is communicatively coupled to the digital control loop to enable a user to view and or adjust a set point of a digital loop controller (e.g., a proportional-integral-derivative (PID) controller) in the digital control loop. In the illustrated examples, the loop interface is located within the control loop at a field location of a process element controlled by the control loop. For example, in a water pressure control system, the loop interface may be located on a water tank of the system regulated by the loop controller.

In some examples, the loop interface overrides a host device in communication with the control loop and/or loop controller of the control loop. In such examples, if the host provides (or previously provided) the loop controller with a set point, the loop interface may override the set point and provide the loop controller with a new set point.

In the illustrated examples, the loop interface enables a user to locally control a digital control loop by enabling display and/or adjustment of one or more settings (e.g. the set point) of the control loop without the use of a host device.

Figure 1:
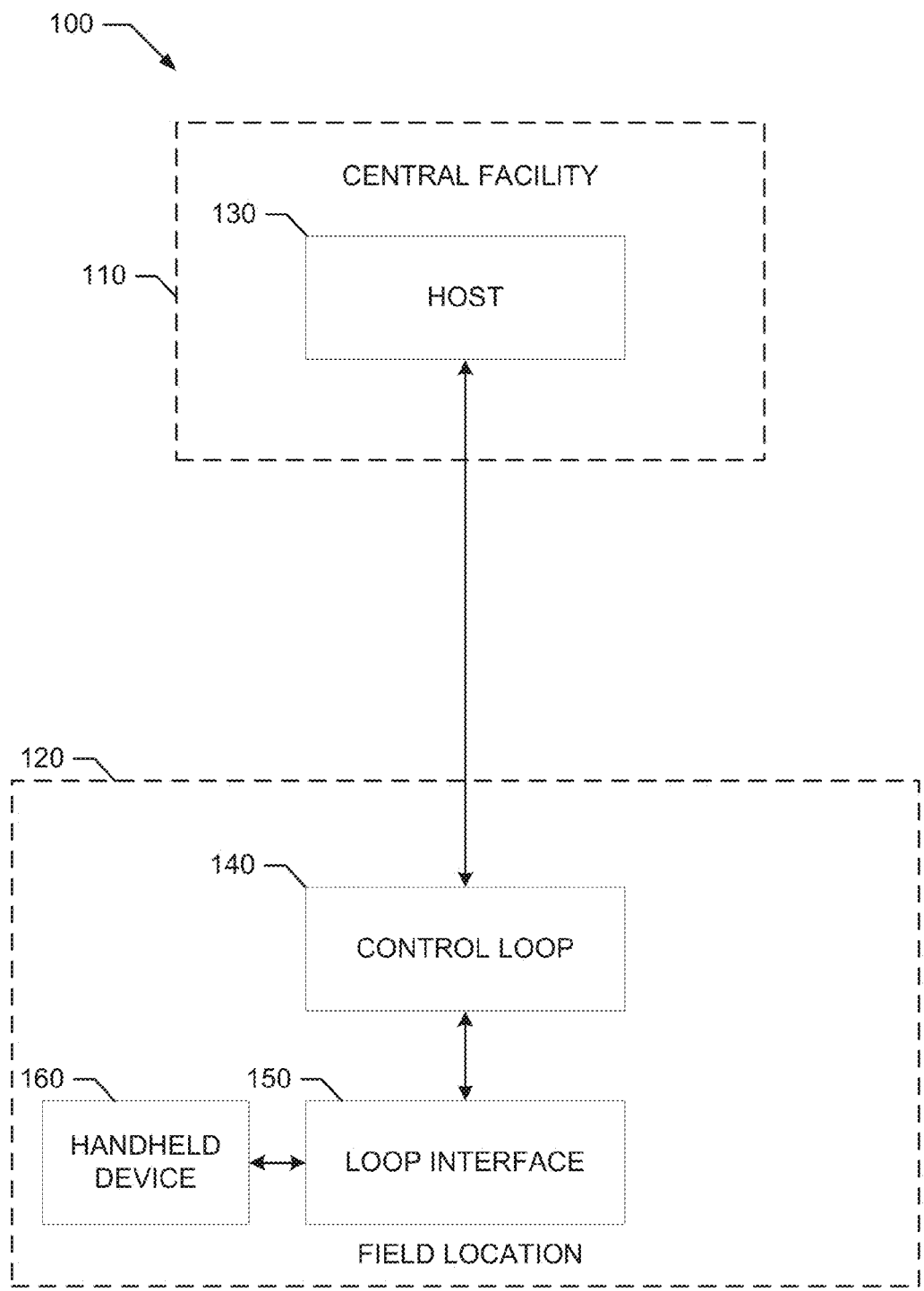
FIG. 1 is a block diagram of an example control loop system including an example loop interface constructed in accordance with the teachings of this disclosure.

FIG. 1 is a block diagram of an example digital control loop system 100 located at a central facility 110 and a field location 120. In the illustrated example, an example host 130 is located at the central facility 110. An example digital control loop 140, an example loop interface 150, and an example handheld device 160 are located at the field location 120. The central facility 110 may be a main hub (e.g., a headquarters, an office, etc.) that monitors several field locations, including the field location 120. The field location 120 may be a factory or other industrial/commercial location monitored by the host 130. In the illustrated example, the central facility 110 and the field location 120 are separated by a substantial distance (e.g., more than 10 meters).

The host 130 may be a computer (e.g., a server, etc.). The control loop 140 may be controlled by a PID controller or other similar loop controller (e.g., a proportional-integral (PI) controller, an integral controller, etc.) to regulate a fluid level, temperature level, pressure level, etc. of a device in the control system 100. The loop interface 150 is constructed in accordance with the teachings of this disclosure. The example handheld device 160 is a diagnostic device that may be used to troubleshoot the control loop 140. For example, the handheld device 160 may be an Emerson™ 375 Field Communicator, an Emerson™ 475 Field Communicator, or another similar device. In the illustrated example, the handheld device 160 may be used to provide a user input (e.g., a set point value) to the loop interface 150.

In the illustrated example of FIG. 1, the host 130 communicates with the control loop 140 via a wired and/or wireless communication. The host 130 is capable of viewing the status of the control loop, including current measurements (e.g., temperature levels, fluid levels, pressure levels, flow, valve position, etc.) and settings (e.g., the set point of the control loop 140). In some examples, the host 130 facilitates startup of the control loop 140 and provides scheduling information for a controller in the control loop 140. In some examples, the host 130 ceases to monitor and/or communicate with the control loop 140, and the control loop 140 continues to run.

In the illustrated example, the control loop 140 of FIG. 1 includes a sensor (e.g., a digital level controller (DLC)), a loop controller, and a device controller (e.g., a digital valve controller (DVC)). However, other controllers and/or devices may be used in the control loop 140.

The example loop interface 150 of FIG. 1 enables a user to access a function block of the control loop 140, for example to set a set point of the control loop 140. In the illustrated example the loop interface 150 communicates with the control loop 140 via a bus protocol (e.g., Fieldbus, Profibus, wireless HART, etc.). In the illustrated example the user may adjust the set point using the loop interface 150 without using the host 130 or having to reconnect the host 130 to the control loop 140 if the host 130 is disconnected. In the illustrated example, the loop interface 150 displays the set point value of the loop interface 150 for the control loop 140. In some examples, the loop interface 150 retrieves and displays other system values in the loop, such as a set point value provided to the control loop 140 by the host 130, a measurement value (e.g., a process variable such as a temperature value, a liquid level value, a pressure value, etc.) of the control loop 140, a control device position (e.g., valve position, etc.), etc. In the illustrated example, the loop interface 150 may override a setting provided by the host 130. In the illustrated example of FIG. 1, the loop interface 150 remains connected or communicatively coupled to the control loop 140 while the control loop 140 is running.

Figure 2:
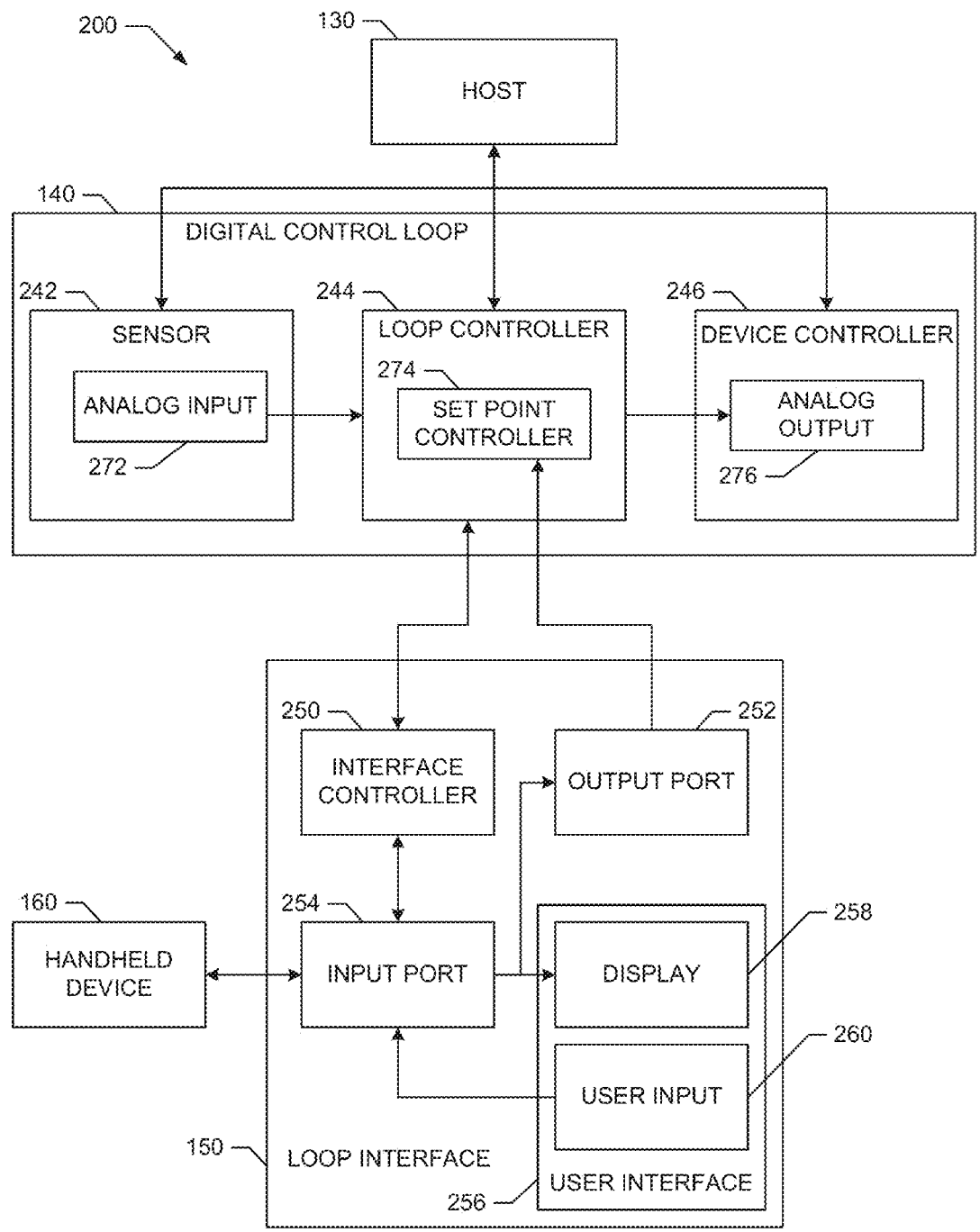
FIG. 2 is a detailed block diagram of an example control loop system that may implement the system of FIG. 1, including a detailed block diagram of an example loop interface that may be used to implement the example loop interface of FIG. 1.

FIG. 2 is a detailed block diagram of an example control loop interface 200 that may implement the system 100 of FIG. 1, including a detailed block diagram of the example loop interface 150 of FIG. 1. In the illustrated example, a bus protocol (e.g., Fieldbus, Profibus, wireless HART, etc.) facilitates communication between the control loop 140, the loop interface 150, and/or the host 130. The host 130 and the handheld device 160 are optional elements of the system 200 in FIG. 2 and, thus, may be disconnected at any time or not used. The control loop 140 includes a sensor 242, a loop controller 244, and a device controller 246. The example loop interface 150 includes an interface controller 250, an output port 252, an input port 254, and a user interface 256. The example user interface 256 includes a display 258 and a user input 260.

In the illustrated example of FIG. 2, the host 130 is capable of communicating with the sensor 242, the loop controller 244, and/or the device controller 246 via wireless and/or wired communication. For example, the host 130 can read a measurement from the sensor 242, adjust a set point of the loop controller 244, and/or adjust a control device (e.g., an actuator) of the device controller 246. In some examples, the host 130 is located offsite at a central facility (e.g., the central facility 110 of FIG. 1). In some examples the host 130 is disconnected from the system and the control loop 140 continues to run when the sensor 242 and/or the device controller 246 is a backup link active scheduler (LAS). Thus, having a backup LAS in the control loop 140 enables the control loop 140 to run without the host 130.

In FIG. 2, the control loop 140 uses the loop controller 244 to control the loop 140, though other types of controllers may be implemented, such as a proportional-integral (PI) controller. In the illustrated example, the sensor 242 provides a process variable representative of a determined measurement value (e.g., a process variable such as a temperature value, a pressure value, a flow rate, etc.) of a control process element (e.g., a fluid tank) via an analog input block 272. The loop controller 244 compares the process variable from the sensor 242 to a set point maintained by a set point controller 274. The set point controller 274 receives set point values from the loop interface 150 and/or the host 130. In some examples, the loop interface 150, via the interface controller 250, provides instructions to the loop controller 244 to override the host 130. In such examples, the set point controller 274 determines that a set point received from the host 130 is to be disregarded and that the loop controller 244 is to use a set point received from the loop interface 150. The example device controller 246 receives instructions to adjust a setting of a control device (e.g., an actuator) of the control process from the loop controller 244 based on a comparison between the set point and the received process variable from the sensor 242. In the illustrated example, the device controller 246 manipulates the setting of a control device (e.g., opens or closes a valve) of the control process via an analog output block 276. In the illustrated example, the sensor 242 and/or the device controller 246 may be backup LASs that schedule control of the loop when the host 130 is disconnected from the loop. In some examples, the loop interface 150 is a backup LAS.

The example loop interface 150 of FIG. 2, enables a user to control and view the set point of the control loop 140 without using the host 130 or having to reconnect the host 130 if it is disconnected from the control loop 140. In the illustrated example of FIG. 2, the interface controller 250 provides instructions to the loop controller 244 that override control from the host 130. This enables a user to quickly adjust the set point of the loop controller 244 while onsite (e.g., in the case of emergencies) without needing to use the host 130, which may be offsite or disconnected.

The loop interface 150 in the illustrated example of FIG. 2 receives one or more set point value(s) from a user via the input port 254. The example input port 254 is a transducer function block that enables the loop interface 150 to communicate with the handheld device 160. Therefore, the user can adjust the set point of the loop controller 244 using the handheld device 160 via the loop interface 150. The handheld device 160 communicates with the loop interface 150 via a wireless and/or wired connection. Alternatively or additionally, the user may use the user input 260 of the user interface 256 to set the set point value of the loop controller 244. The user input 260 may include one or more of a keyboard, keypad, mouse, trackball, touchscreen, or other similar input buttons or dials. In the illustrated example, the display 258 of FIG. 2 displays the set point value to the user. In some examples, the display 258 is capable of displaying other values received from the interface controller 250. In some examples, the interface controller 250 retrieves the measurement value (e.g., a process variable) received from the sensor 242, a set point value received from the host 130, or other similar value from the control loop 140. In such examples, the interface controller 250 provides the retrieved values to the user interface 256 via the input port 254.

In the illustrated example of FIG. 2, the input port 254 forwards the set point to the output port 252. The example output port 252 is an analog input block capable of communicating with the loop controller 244. Accordingly, the output port 252 sends the received set point to the loop controller 244. The loop controller 244 controls the loop 140 using the set point received from the output port 252 of the loop interface 150. In some examples, the output port 252 includes multiple analog input blocks that are connected to one or more additional control loops, to enable control of multiple control loops.

In some examples, manual operation of the device controller 246 may be desirable. In such examples, the loop interface 150 may be indirectly or directly communicatively (e.g., via the output port 252) coupled to the device controller 246 to manually adjust the analog output 276. For example, the loop controller 244 may identify a failure of the sensor 242. In such an example, the user may be notified via the loop interface 150 and/or host 130. The loop interface 150 may then allow the user to manually control the analog output 276 of the device controller 246 (e.g., open or close a valve). In some examples, the loop interface 150 can be used in manual mode for diagnostics, experimentation, emergency situations, etc. that may require manual control of the device controller 246.

While an example manner of implementing the loop interface 150 of FIGS. 1 and/or 2 has been illustrated in FIG. 2, one or more of the elements, processes and/or devices illustrated in FIG. 2 may be combined, divided, re-arranged, omitted, eliminated and/or implemented in any other way. Further, the example interface controller 250, the example output port 252, the example input port 254, the example user interface 256 and/or, more generally, the example loop interface 150 of FIG. 2 may be implemented by hardware, software, firmware and/or any combination of hardware, software and/or firmware. Thus, for example, any of the example interface controller 250, the example output port 252, the example input port 254, the example user interface 256 and/or, more generally, the example loop interface 150 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example interface controller 250, the example output port 252, the example input port 254, the example user interface 256 are hereby expressly defined to include a tangible computer readable storage medium such as a memory, DVD, CD, Blu-ray, etc. storing the software and/or firmware. Further still, the example loop interface 150 of FIG. 2 may include one or more elements, processes and/or devices in addition to, or instead of, those illustrated in FIG. 2, and/or may include more than one of any or all of the illustrated elements, processes and devices.

Figure 3:
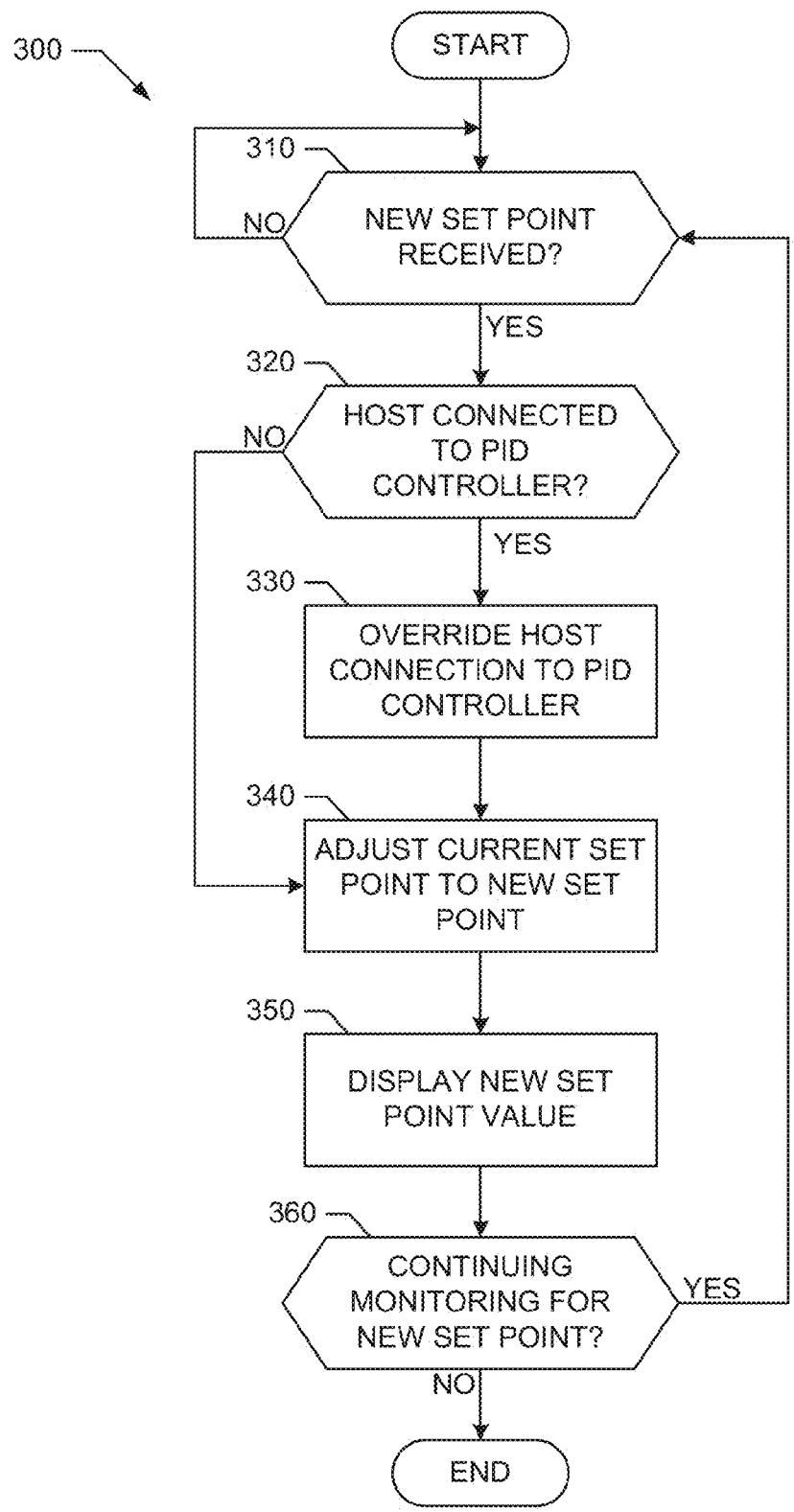
FIG. 3 is a flowchart representative of an example method that may be performed to implement the example loop interface of FIGS. 1 and/or 2.

A flowchart representative of an method 300 for implementing the loop interface 150 of FIGS. 1 and/or 2 is shown in FIG. 3. In this example, the method 300 may be implemented by a program executed by a processor such as the processor 512 shown in the example processor platform 500 discussed below in connection with FIG. 5. The program may be embodied in software stored on a tangible computer readable storage medium such as a CD-ROM, a floppy disk, a hard drive, a digital versatile disk (DVD), a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIG. 3, many other methods of implementing the example loop interface 150 may alternatively be used. For example, the order of execution of the blocks may be changed, and/or some of the blocks described may be changed, eliminated, or combined.

As mentioned above, the example method 300 of FIG. 3 may be implemented using coded instructions (e.g., computer readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable storage medium is expressly defined to include any type of computer readable storage device and/or storage disk and to exclude propagating signals. Additionally or alternatively, the example operations of FIG. 3 may be implemented using coded instructions (e.g., computer readable instructions) stored on a non-transitory computer readable storage medium such as a hard disk drive, a flash memory, a read-only memory, a compact disk, a digital versatile disk, a cache, a random-access memory and/or any other storage medium in which information is stored for any duration (e.g., for extended time periods, permanently, brief instances, for temporarily buffering, and/or for caching of the information). As used herein, the term non-transitory computer readable storage medium is expressly defined to include any type of computer readable storage disk or storage device and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Turning in detail to FIG. 3, at block 310, the interface controller 250 determines whether the input port 254 has received a new set point value from the user. The input port 254 may receive the new set point value from the external handheld device 160 or the user interface 256. If the interface controller 250 determines that no new set point has been received the method 300 remains at block 310. If the interface controller 250 determines that a new set point has been received, the method 300 moves to block 320.

At block 320 of FIG. 3, the example interface controller 250 determines whether the host 130 is connected (e.g., communicatively coupled) to the loop controller 244 of the control loop 140. In the illustrated example, the interface controller 250 may determine whether the host 130 is connected to the loop controller 244 based on the number and/or type of active data connections to the loop controller 244. In the illustrated example, if the example interface controller 250 determines that the host 130 is connected to the loop controller 244, the method 300 moves to block 330. In the illustrated example, if the interface controller 250 determines that the host 130 is not connected to the loop controller 244, then the method 300 moves to block 340.

At block 330 of FIG. 3, the interface controller 250 overrides the host connection to the loop controller 244. For example, the interface controller 250 may provide instructions to the loop controller 244 to disregard any set point values received from the host 130. In another example, the interface controller 250 may temporarily terminate the connection between the host 130 and the loop controller 244. Other techniques may be used. However, ultimately, the interface controller 250 is capable of taking control of the set point value using a set of override instructions.

At block 340 of FIG. 3, the example interface controller 250 instructs the input port 254 to forward the new set point value to the output port 252. The output port 252 outputs the set point value as an analog input to the loop controller 244. At block 350, the new set point 350 is displayed to the user via the display 258 of the user interface. In some examples, the interface controller 250 provides loop information to display along with the new set point to identify the loop associated with the new set point value (in the example of when the loop interface 150 is connected to and/or controls multiple loops). In some examples, such as when the new set point value is received from the user interface 256, the new set point value may be displayed between block 310 and block 320 of FIG. 3.

At block 360 of FIG. 3, the interface controller 250 determines whether to continue to monitor the input port 254 and/or the loop controller 244 for changes to the set point value. In the illustrated example, if the interface controller 250 determines that the monitoring is to continue, control returns to block 310. In the illustrated example, if the interface controller 250 determines that the monitoring is to end, for example because the loop interface was disconnected from the control loop 140 or the control loop 140 has been shut down, the method 300 ends.

Figure 4:
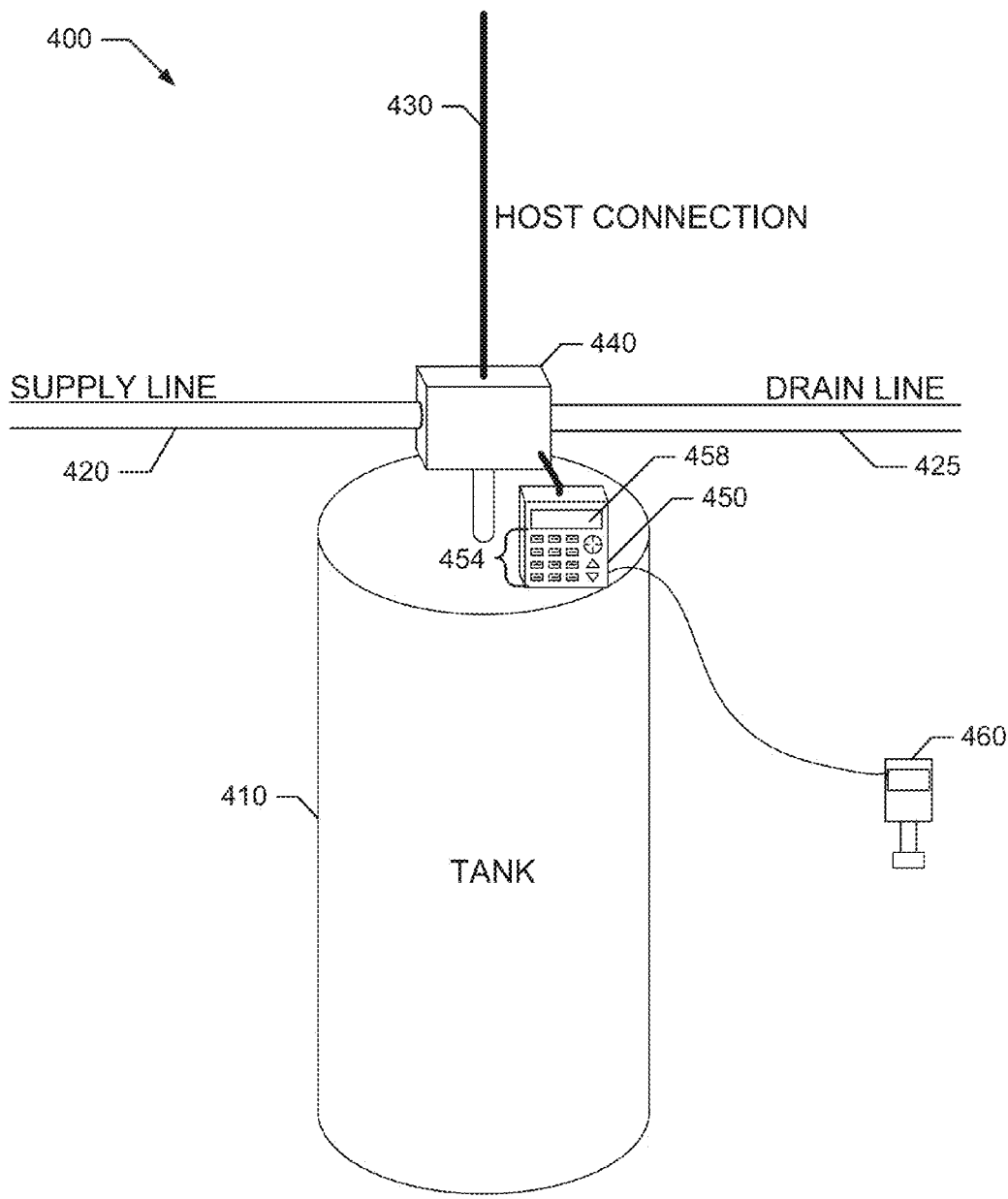
FIG. 4 is an example environment in which the example loop interface of FIGS. 1 and/or 2 may be used.

FIG. 4 illustrates an example environment 400 (e.g., the field location 120 of FIG. 1) in which the example loop interface 150 of FIGS. 1 and/or 2 may be used. The example environment 400 includes a process element 410 represented by a tank, a supply line 420, a drain line 425, a host connection 430, a control box 440, and a control interface 450. An optional handheld device 460 may be included in the environment 400 to communicate with the control interface 450, which may be used to implement the loop interface 150 of FIGS. 1 and/or 2. The example process environment 400 may be a portion of a larger process or system environment. The example tank 410 may be used for regulating pressure, fluid temperature, fluid storage, etc. In the illustrated example, the example tank 410 is used as a water leveling tank. The control box 440 includes an example control loop, such as the control loop 140 of FIGS. 1 and/or 2, to regulate the volume of the water in the tank 410. The example control loop of the control box 440 may regulate the volume of water using a sensor (e.g., the sensor 242 of FIG. 2), a loop controller (e.g., the loop controller 244 of FIG. 2), and/or a device controller (e.g., the device controller 246 of FIG. 2). In the illustrated example, the control box 440 regulates the water volume by controlling the flow of water into the tank 410 via the supply line 420 or from the tank 410 via the drain line 425 (e.g., via the device controller 246).

In the illustrated example of FIG. 4, a host (e.g., the host 130 of FIGS. 1 and/or 2) communicates with the control box 440 via the host connection 430. The example host is not shown in FIG. 4 as it is not located in the example environment 400. The host connection 430 may be active or inactive at any time while the control loop of the control box 440 regulates the volume of the water in the tank 410. In the illustrated example, the host connection 430 is inactive as no host is connected to the control box 440.

In the illustrated example, a user may use the control interface 450 to change a set point of the control loop in the control box 440. The example control interface 450 includes input buttons 454 and a display 458 to present the set point value to the user as described herein. Accordingly, in the illustrated example of FIG. 4, even though a host is not connected to the control box 440 to regulate the volume of the water in the tank 410, a user may manipulate the volume by adjusting the set point of the control loop in the control box 440 using the control interface 450.

For example, the control interface 450 of FIG. 4 enables control of the control loop in the control box 440 in emergency situations when a host is not connected via the host connection 430 or in situations where the host is located offsite relative to the environment 400. In other examples, the control interface 450 enables a user to easily change the set point of the control loop for testing purposes without having to use the host or having to reconnect the host via the host connection 430. In some examples, the control interface 450 may be used to manually adjust a valve of the control box 440 (e.g., when a device controller, such as the device controller 246, of control box 440 is in manual mode) to allow for more or less flow of water into or from the example tank 410. In some examples, the control interface 450 may be included within the same housing as the control box 440.

Figure 5:
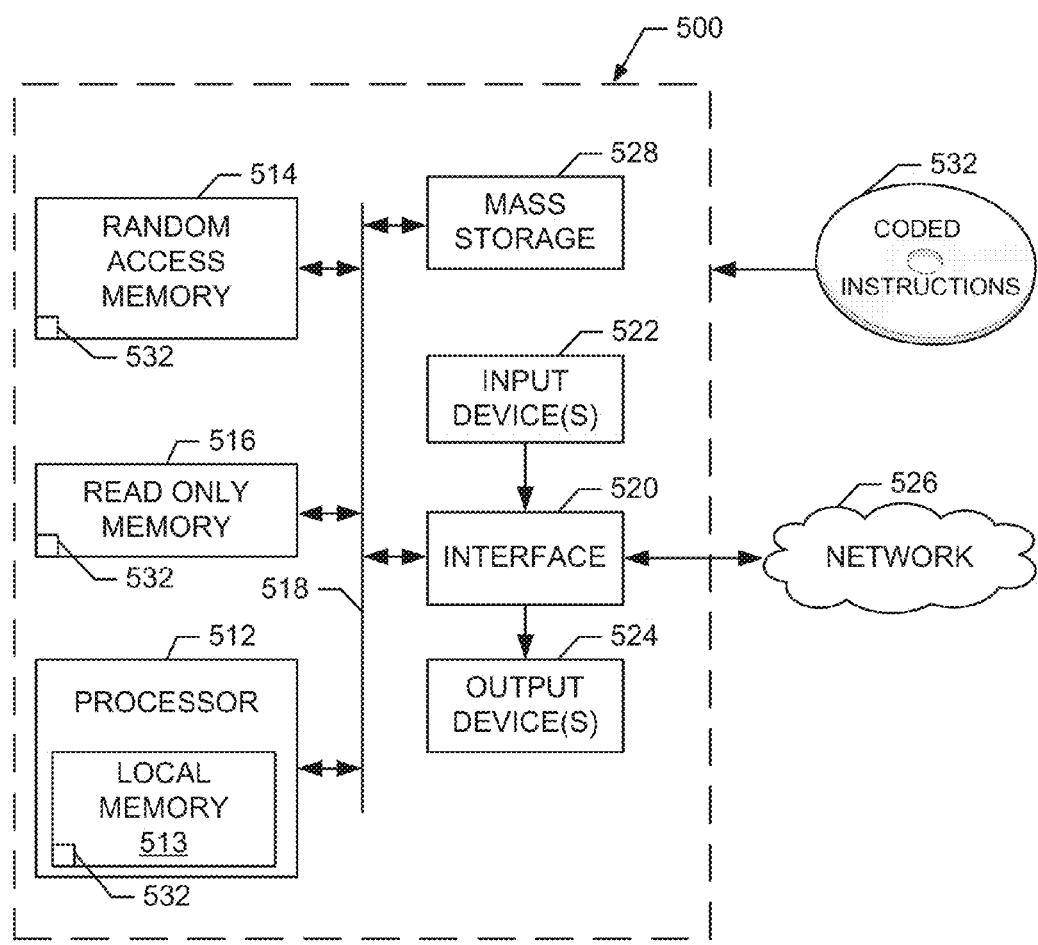
FIG. 5 is a block diagram of an example processor platform which may implement the example loop interface of FIGS. 1 and/or 2 and/or the example method of FIG. 3.

FIG. 5 is a block diagram of an example processor platform 500 capable of executing the machine readable instructions to implement the loop interface 150 of FIGS. 1 and/or 2, the method 300 of FIG. 3, and/or the control box 440 and control interface 450 of FIG. 4. In some examples, the example processor platform 500 is capable of executing instructions to control the loop interface 150, the example sensor 242, the example loop controller 244, and/or the example device controller 246. The processor platform 500 can be, for example, a server, a personal computer, a mobile phone (e.g., a cell phone), a personal digital assistant (PDA), or any other type of computing device.

The processor platform 500 of the instant example includes a processor 512. For example, the processor 512 can be implemented by one or more microprocessors or controllers from any desired family or manufacturer.

The processor 512 includes a local memory 513 (e.g., a cache) and is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The processor platform 500 also includes an interface circuit 520. The interface circuit 520 may be implemented by any type of interface standard, such as an Ethernet interface, a universal serial bus (USB), and/or a PCI express interface.

One or more input devices 522 are connected to the interface circuit 520. The input device(s) 522 permit a user to enter data and commands into the processor 512. The input device(s) can be implemented by, for example, a keyboard, a mouse, a touchscreen, a track-pad, a trackball, isopoint and/or a voice recognition system. The input device(s) may be used to implement the user input 260 of FIG. 2.

One or more output devices 524 are also connected to the interface circuit 520. The output devices 524 can be implemented, for example, by display devices (e.g., a light emitting diode display, a liquid crystal display, a cathode ray tube display (CRT)). The interface circuit 520, thus, typically includes a graphics driver card. The output devices 524 may be used to implement the display 258 of FIG. 2.

The interface circuit 520 also includes a communication device such as a modem or network interface card to facilitate exchange of data with external computers via a network 526 (e.g., an Ethernet connection, a digital subscriber line (DSL), a telephone line, coaxial cable, a cellular telephone system, a two wire bus, etc.).

The processor platform 500 also includes one or more mass storage devices 528 for storing software and data. Examples of such mass storage devices 528 include floppy disk drives, hard drive disks, compact disk drives and digital versatile disk (DVD) drives.

Coded instructions 532 to implement the method of FIG. 3 may be stored in the mass storage device 528, in the volatile memory 514, in the non-volatile memory 516, and/or on a removable storage medium such as a CD or DVD.

From the foregoing, it will appreciate that the above disclosed methods, apparatus and articles of manufacture enable a user to locally control a control loop without the use of a host or the need to connect a host to the control loop.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An apparatus comprising:
 a loop controller to control a control loop based on a set point value received from a host;
 a sensor to provide a measurement value to the loop controller;
 a device controller to adjust a control device based on an output from the loop controller; and
 a loop interface to communicatively couple to the loop controller, the loop interface:
  to display the set point value of the loop controller;
  to determine whether a new set point value has been received from at least one of a user interface of the loop interface or a handheld device removably coupled to the loop interface; and
  upon determining the new set point value has been received:
   to send the new set point value to the loop controller and cause the loop controller to disregard the set point value from the host; and
   to prevent the host from adjusting the new set point value by automatically terminating a connection between the host and the loop controller.

2. An apparatus according to claim 1, wherein the loop interface receives the new set point value from a user via at least one of the user interface or the handheld device.

3. An apparatus according to claim 1, wherein user interface includes:
 a display to indicate the set point value and the new set point value; and
 a user input to set the new set point value.

4. An apparatus according to claim 1, wherein the loop interface identifies a change to the set point value of the loop controller and displays the change on the user interface.

5. An apparatus according to claim 1, wherein the loop interface further includes an interface controller to override control from the host.

6. An apparatus according to claim 1, wherein the loop interface and the device controller are proximately located at a field location of the control loop and the host is located at a central facility.

7. An apparatus according to claim 5, wherein the interface controller overrides control from the host by instructing the loop controller to disregard the set point value from the host.

8. An apparatus according to claim 1, wherein the control loop continues to operate when the connection with the host is terminated.

9. A method comprising:
 adjusting a control device based on an output from a loop controller associated with a control loop and a set point value provided by a host communicatively coupled to the control loop;
 displaying the set point value at a loop interface connected to the control loop;
 determining, with the loop interface, whether an override set point value has been received from at least one of a user interface of the loop interface or a handheld device communicatively coupled to the loop interface;
 when the override set point value has been received:
  sending the override set point value from the loop interface to the loop controller and controlling the control device based on the override set point value; and
  disregarding the set point value from the host to prevent the host from adjusting the override set point value by automatically terminating a connection between the host and the loop controller, the control loop continuing to operate via the override set point when the connection between the host and the control loop is terminated.

10. A method according to claim 9, wherein receiving the override set point value at the loop interface includes receiving the override set point value from a user via at least one of the user interface or the handheld device.

11. A method according to claim 9, further comprising identifying a change to the set point value of the loop controller and displaying the change on the user interface.

12. A method according to claim 9, further comprising automatically overriding control from the host with an interface controller of the loop interface when the loop interface receives the override set point.

13. A method according to claim 12, wherein overriding control from the host includes instructing the loop controller to disregard the set point value provided by the host.

14. An article of manufacture comprising instructions that, when executed, cause a processor to at least:
 receive a set point value from a loop controller of a control loop at a loop interface, the set point value provided by a host in communication with the loop controller;
 display the set point value via a user interface of the loop interface, the loop interface including an input port to communicate with a handheld device configured to removably couple to the loop interface;
 determine whether an override set point value has been received at the input port from at least one of a user interface of the loop interface or the handheld device;
 when the override set point value has been received:
  determine, with the loop interface, whether the host is connected to the loop controller;
  when the host is connected to the loop controller:
   send the override set point value to the loop controller to adjust a control device based on the override set point value and a measurement value from a sensor of the control loop; and prevent the host from adjusting the override set point value by automatically terminating a connection between the host and the loop controller.

15. An article of manufacture according to claim 14, wherein the instructions, when executed, further cause the processor to identify a change to the set point value and display the change on the user interface.

16. An apparatus comprising:
an analog input block that sends a set point value received from a host to a loop controller of a control loop;
a display for displaying the set point value, wherein the display is to be located proximate to the control loop; and
a loop interface communicatively coupled to the control loop, the loop interface to:
determine whether a new set point value has been received from a user via a handheld device configured to be removably coupled to the loop interface; and
when the new set point value has been received:
send the new set point value to the loop controller; and
prevent the host from adjusting the new set point value by automatically terminating a connection between the host and the loop controller.

17. An apparatus according to claim 16, wherein the new set point value is received via an input port of the loop interface.

18. An apparatus according to claim 16, wherein the display is to present changes to the set point value.

19. A method comprising:
receiving a set point value for a control loop from a host communicatively coupled to the control loop;
determining, with a loop interface communicatively coupled to the control loop, whether a new set point value has been received via a handheld device configured to removably couple to the loop interface;
when the new set point value has been received:
sending, with the loop interface, the new set point value received from the handheld device to a loop controller of the control loop;
determining, with the loop interface, whether the host is communicatively coupled to the control loop;
preventing, with the loop interface, the host from adjusting the new set point value by automatically terminating a connection between the host and the loop controller; and
adjusting a set point of the control loop from the set point value provided by the host to the new set point value provided by the loop interface.

20. A method according to claim 19, further comprising displaying a change to the set point value via a display of the user interface.

21. A method according to claim 20, further comprising scheduling control of the control loop via the loop interface.

22. A method according to claim 19, further including instructing the loop controller to disregard the set point value from the host automatically upon detection of the new set point.

\* \* \* \* \*